(12) United States Patent
McCulligh

(10) Patent No.: US 6,643,784 B1
(45) Date of Patent: Nov. 4, 2003

(54) PASSWORD GENERATION METHOD AND SYSTEM

(75) Inventor: Murray R. McCulligh, Ottawa (CA)

(73) Assignee: Entrust Technologies Limited, Ottawa (CA)

(*) Notice: Subject to any disclaimer, the term of this patent is extended or adjusted under 35 U.S.C. 154(b) by 0 days.

(21) Appl. No.: 09/211,239

(22) Filed: Dec. 14, 1998

(51) Int. Cl.[7] .................. G06F 11/30; G06F 15/173; G06F 17/21; G06F 15/16
(52) U.S. Cl. .................. 713/202; 709/223; 709/229; 704/10
(58) Field of Search .................. 713/200, 201, 713/202; 707/35, 533; 709/100, 229, 223; 706/46, 47

(56) References Cited

U.S. PATENT DOCUMENTS 5,774,834 A * 6/1998 Visser .................. 713/533
5,793,952 A * 8/1998 Limsico .................. 713/202

OTHER PUBLICATIONS

Aitken, Scanning Your Input Option, Jul. 1991, v7, p. 72(2).*
Tong, An Assembly Password Routine, Feb. 9, 1993, PC Magazine, v12, p. 434(3).*
Lee, The Cutting Edge Paranoia Your Password? Ok, But Don't Tell Anyone, Apr. 11, 1994, The Los Angeles Times, 25–27.*
Webster's II New College Dictionary, 1995, Houghton Mifflin Company, p. 353.*

* cited by examiner

Primary Examiner—Gail Hayes
Assistant Examiner—Jenise Jackson
(74) Attorney, Agent, or Firm—Vedder, Price, Kaufman & Kammholz, P.C.

(57) ABSTRACT

A system and method employs a password rule data provider that provides password generation rule data to a notification device, such as visual display device or audible output device. A password data evaluator, such as a per character password data evaluator, continuously evaluates password character data as its being entered and compares each character to the password generation rule data. A dynamic status data generator dynamically generates password rule status data, such as visual indication of which rule has been met or which rule has not been met as password data is being entered.

28 Claims, 5 Drawing Sheets

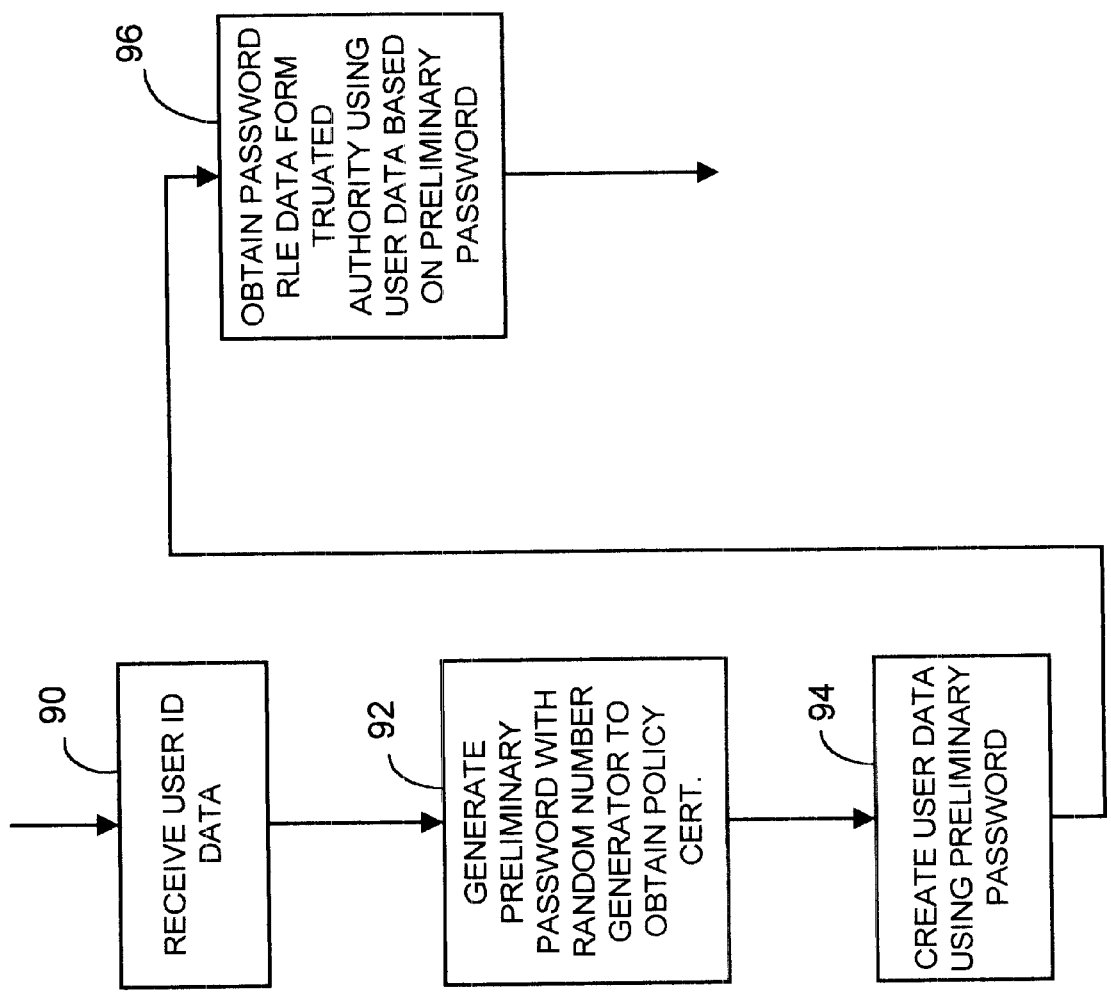

PASSWORD GENERATION METHOD AND SYSTEM

FIELD OF THE INVENTION

The invention relates generally to systems and methods for facilitating initial entry during selection of password information, and more particularly to systems and methods for facilitating initial entry during password selection and generation that employ feedback as to whether or not a password has been properly initially entered or generated.

BACKGROUND OF THE INVENTION

With the increase in electronic information exchange, the use of passwords and other security authorization mechanisms for use with communication systems, computer systems, telephones and other devices, has become more important. As password cracking programs become more sophisticated, the length of passwords and types of variations for character order, length, and character type have become increasingly complex to try to thwart programs and malicious personnel from determining a user's password to gain entry into a particular system, program, access to cryptographic keys or data in a storage medium.

Generally, the more "random" a password, the more difficult it can be to decipher. As a mechanism to assist users in entering suitably "random" passwords, some systems provide a text based list of rules through a graphic user interface that allow a user to read the rules prior to entering the password during login or during a password change operation. For example, if a particular password mechanism requires the use of at least one capital letter and at least one numerical character, the system provides visual rules in the form of text to the user that the user must enter at least one capital letter and one number as part of the password in order for the password to be accepted by the system. However, if the user fails to properly enter a desired character as predetermined by the system, the user typically will not be notified of the improper entry until a suitable number of characters have been entered. Where the password is relatively long or where password selection is required frequently, this can be a cumbersome and frustrating process. In addition, conventional initial password entry systems having multiple rules typically only notify a user of one rule that has been broken and a user must keep reentering password characters until the user finally enters the character (or password information) correctly. For example, if there are many different password entry rules, such as password length, nonredundancy of certain characters, capital letter character requirements and other requirements, a system typically will only notify the user of the first rule in the list that has not been met although many rules may not have been met by the user. Hence the user has to repetitiously correct the entry of password character information iteratively to satisfy the next rule on the list. Moreover, conventional initial password entry systems typically do not perform the password character and rule comparison until after the system receives password entry complete data, such as when a user hits the keyboard button or GUI button after or the user believes that a password has been entered. As such, a user does not know that the password may have been improperly entered until after the user notifies the system.

Such problems become compounded when password rule data is configurable, such as in a system entitled "A Computer Network Security System and Method Having Unilateral Enforceable Security Policy Provision" described in co-pending Patent Application No. 08/986,457, filed Dec. 8, 1998 and assigned to instant assignee. In such systems, a central authority may designate through a signed certificate the password rules that the system requires for every user in the system on a per user per application or per user class basis. These rules may be changed by a security manager or other personnel and it may be changed in a per user basis or other suitable basis frequently. As such, the rules continually change. It can be difficult to keep track of dynamically changing password rule requirements.

Consequently, a need exists for a system and method for facilitating password generation or initial password entry that provides a continuous evaluation of password character data entry and dynamically generates failed rule information to a user on a dynamic basis so that the user need not wait until a password is completely entered to be informed that password has been improperly entered. In addition, it would be desirable if such a system allowed the use of configurable rule data so that if password entry rules are changed, the system automatically accounts for the rule changes without user intervention. It would also be desirable if such a system and method had flexibility in allowing the continuous evaluation and dynamic generation of rule data compliance on a variable character length basis.

BRIEF DESCRIPTION OF THE DRAWINGS

FIG. 3 is a flow chart illustrating the operation of a portion of the flow chart of FIGS. 2a and FIG. 2b.

DETAILED DESCRIPTION OF THE PREFERRED EMBODIMENT

Briefly, a system and method employs a password rule data provider that provides password generation rule data to a notification device, such as visual display device or audible output device. A password data evaluator, such as a per character password data evaluator, continuously evaluates password character data as its being entered and compares each character to the password generation rule data. A dynamic status data generator dynamically generates password rule status data, such as visual indication of which rule has been met or which rule has not been met as password data is being entered.

In one embodiment a policy certificate analyzer receives signed policy certificate data from a trusted authority unit. The policy certificate includes configurable password generation rule data that may be distributed to a plurality of users to facilitate centralized rule data compliance but whose rules can be flexibly modified. The system and method facilitates, in another embodiment, a variable character length evaluation mechanism so that rules are not evaluated until a predefined number of characters have been entered. The system and method continuously evaluates password data as it is being received and continually updates password notification information to a user to provide, in effect, real time feedback before the system receives password entry complete data.

Figure 1:
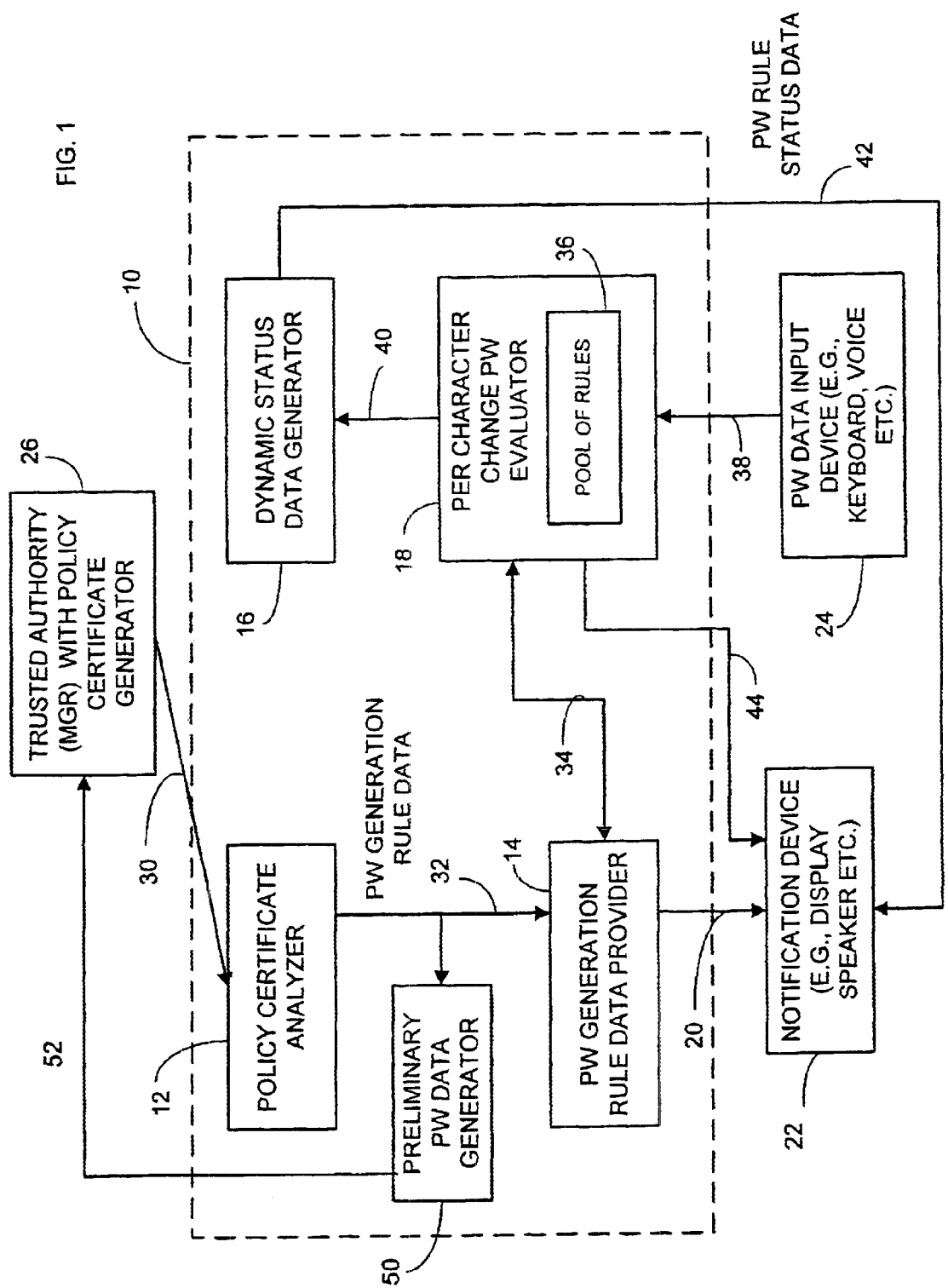
FIG. 1 is a block diagram illustrating one embodiment of a system for facilitating password generation employing a centralized rule data provider and a dynamic status data generator in accordance with the invention.

FIG. 1 shows one example of the apparatus for facilitating password generation 10 incorporated into a computer network system. It will be recognized that the apparatus 10 may be utilized in a standalone unit if desired or any suitable system. The apparatus 10 may be a suitably programmed computer or any other suitable hardware/software combination if desired. The apparatus 10 includes a policy certificate analyzer 12, a password generation rule data provider 14, a dynamic status generator 16 and a password character change evaluator 18. The apparatus 10 provides in this embodiment, password generation rule data 20 that is in text form to a notification device 22 such as a display device, audible device such as a speaker, or other suitable user notification device. A password character input device 24 allows a user or other software application to input password data characters to the apparatus 10. The password character input device 24 may be a keyboard, voice recognition system, software application, or any other suitable input mechanism.

When used in a computer network system, the apparatus 10 may be operatively coupled to a manager server which has software serving as a policy certificate generator 26. The manager server with policy certificate generator 26 may generate public key certificates, such as those that are compliant with ITU-T Recommendation X.500standards as known in the art, or any other suitable certificate mechanism where a trusted authority signs information through a cryptographic mechanism for use by a relying party. In this embodiment, the policy certificate generator 26 and the apparatus 10 use public key cryptography techniques, as known in the art, to verify policy certificate data. One example of a policy certificate generator may be found for example in co-pending patent application entitled, "A Computer Network Security System and Method Having Unilateral Enforceable Security Policy Provision", Patent Application No. 08/986,457, filed Dec. 8, 1998, assigned to instant assignee, and hereby incorporated by reference as though fully stated herein. The policy certificate generator 26 generates certificates that contain password generation rule data that is used by a plurality of nodes such as a node containing apparatus 10. In this way, a centralized security mechanism is provided to ensure that all nodes or specific class of users use the same password generation rule data.

The policy certificate analyzer 12 pulls the password generation rule data from a policy certificate 30 received from the policy certificate generator 26. For example, certain fields of a policy certificate or data elements of a policy certificate include data representing rules by which passwords are required to be entered before being accepted as a complete password. The policy certificate analyzer 12 receives a signed policy certificate 30 from the policy certificate generator which is a trusted authority unit. The policy certificate 30 includes configurable password generation rule data configured by the trusted authority. It may be configurable, for example, on a per user class basis such that all users that require higher levels of security, for example, receive different password entry rule data than users who are in a class that do not have access to secret information in the network. Once analyzed, the policy certificate analyzer 12 outputs password generation rule data 32 which may be, for example, configurable password entry data or password generation rule data that must be met before the password is accepted by the apparatus 10.

The password rule data provider 14 provides password generation data to the notification device 22. As previously mentioned, the password generation rule data may be in the form of a list of rules (e.g., in the form of text) that a user may look at to know which character data needs to be entered for an acceptable password as well as data used by the apparatus to compare whether entered password character data complies with the rule data. The password generation rule data provider outputs password rule identification data 34 to the password character change password evaluator 18. The rule ID data 34 is used to select the configured rules from a pool of rules 36 stored for use by the password character change evaluator. For example, a pool of rules may contain a list of a total of thirty password rules, any of which may be selected as configured by the policy and certificate generator 26. As such the rule ID data acts as a switch to turn on only those rules required to be output to the notification device as password generation rule data 20.

The password character change evaluator 18, in one embodiment, operates as a per character password data evaluator that continuously evaluates the password character data on a per character basis in view of the password generation rule data by comparing the password data character change information 38 received from the password data input device and the selected rules identified by the rule ID data 34. Accordingly, when a user enters a single character, the per character change password evaluator 18 determines which, if any, of the sets of rules have been met and outputs pass/fail status data 40 as output on a per rule basis to the dynamic status data generator 16. The dynamic status data generator 16 dynamically generates password rule status data associated with each given rule data that has been selected from the pool based on each changed or entered password character. The dynamic status data generator 16 outputs status data 42 to the notification device continuously as password characters are being input. The status data 42 may be, for example, a visual indication or check mark that a rule from the text password generation rule 20 has been satisfied by the last entered character. The dynamic status generator 16 by dynamically generating password rule status data facilitates real time feedback for a user on a per password character basis so that user need not wait until the end of the entire password character string is entered before knowing whether or not the password was properly entered. Moreover, the status data being visually or audibly displayed on a continuous basis, for example, after each character has been entered, provides immediate visual feedback for the user so that the user can know exactly which rule has not been met or has been met by the entry of the last password character that has been entered into the password data input device 24.

Also, the per character change password evaluator 18 generates acceptance password change data 44 to the notification device 22 when all of the rules have been met. As such, there is no need for a user to activate password entry complete data as the per character change password evaluator 18 will automatically generate the acceptance password change data when there have been enough characters entered or, for example, where all characters that have been entered conform to the configured rule data.

The per character password data evaluator 18 evaluates password character data on a predefined character length basis against each rule corresponding to the password generation rule data prior to receiving complete entry data or generating acceptance password change data. Also, the dynamic status generator 16 generates the password rule status data 42 upon a change in rule status, prior to receiving complete entry data, based on the continuously evaluated password character change data 38. The password rule status data 42 includes confirmation data, such as a checkmark or other data corresponding to display rules that have been met so that the user can visually or audibly determine in a real time manner which rules have been met or if rules have not been met. The password rule status data 42 may include non-confirmation data such as data indicating that rule data has not been satisfied. Preferably, the password rule status data 42 includes both non-confirmation data and confirmation data so that the user can visually or audibly determine immediately which rules have and have not been met.

In other words, the per character password data evaluator 18 provides continuous password character rejection data and/or acceptance data on a per character basis (predefined character length basis may be one or more characters) in response to continuously evaluating the password data 38 prior to receiving password entry complete data. In other words, the per character password data evaluator 18 provides continuous password character rejection data and/or acceptance data on a per character basis (predefined character length basis may be one or more characters) in response to continuously evaluating the password data 38 prior to receiving password entry complete data. However, it will be recognized that the system ultimately will generate either one or the other type of data if desired. Alternatively, the evaluator 18 evaluates password character data on a single character basis after an initial predefined character length has been reached. For example, the system may allow entry of three characters before evaluation and continuous per character evaluation on each entered character thereafter.

Also if desired, the apparatus 10 may include a variable character length selector that selects the number of password characters that are continuously evaluated to determine whether password generation rule data has been satisfied. For example, the variable character length selector may be selectable by or through policy certificate data in the policy certificate 30 so that the system will evaluate three characters versus each individual character, if desired.

The apparatus 10 may optionally include a preliminary password data generator 50 that is used upon initialization of a user that has not entered a password previously. For example, during the first login the preliminary password data generator 50 obtains password generation rule data 32 prior to the apparatus 10 receiving password data character change information 38. The preliminary password data generator 50 may generate, for example, a random password that is used to send policy certificate request data 52 to the policy certificate generator 26 to obtain the policy certificate 30 the very first time the user enters or desires a login. In this way, the system may automatically obtain the configurable password generation rule data based on a secure type of password since the system cannot authorize a final password based on the input data.

Figure 2A:
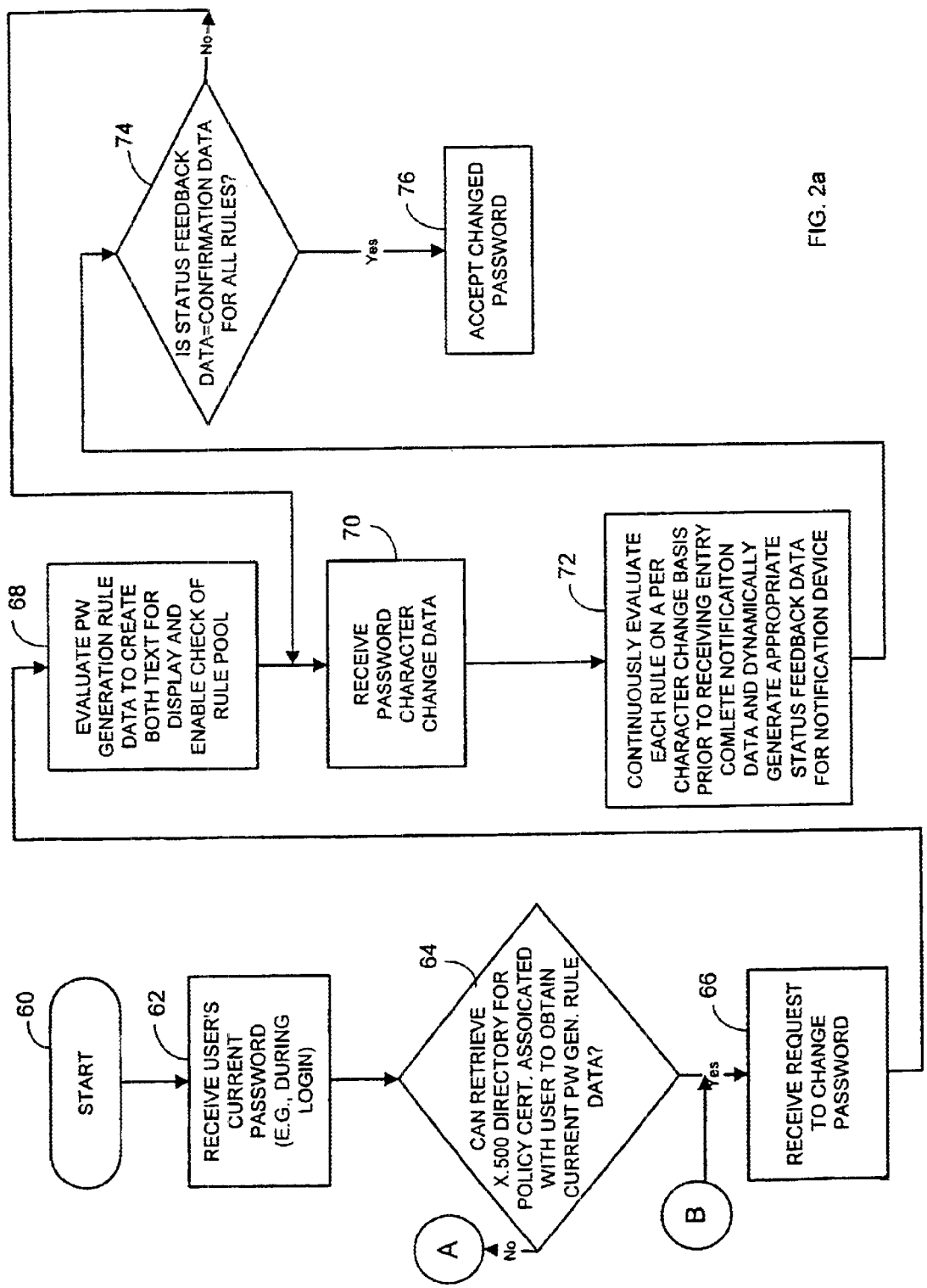
FIGS. 2a and 2b illustrate a flow chart depicting one operation of the system shown in FIG. 1.
Figure 2B:
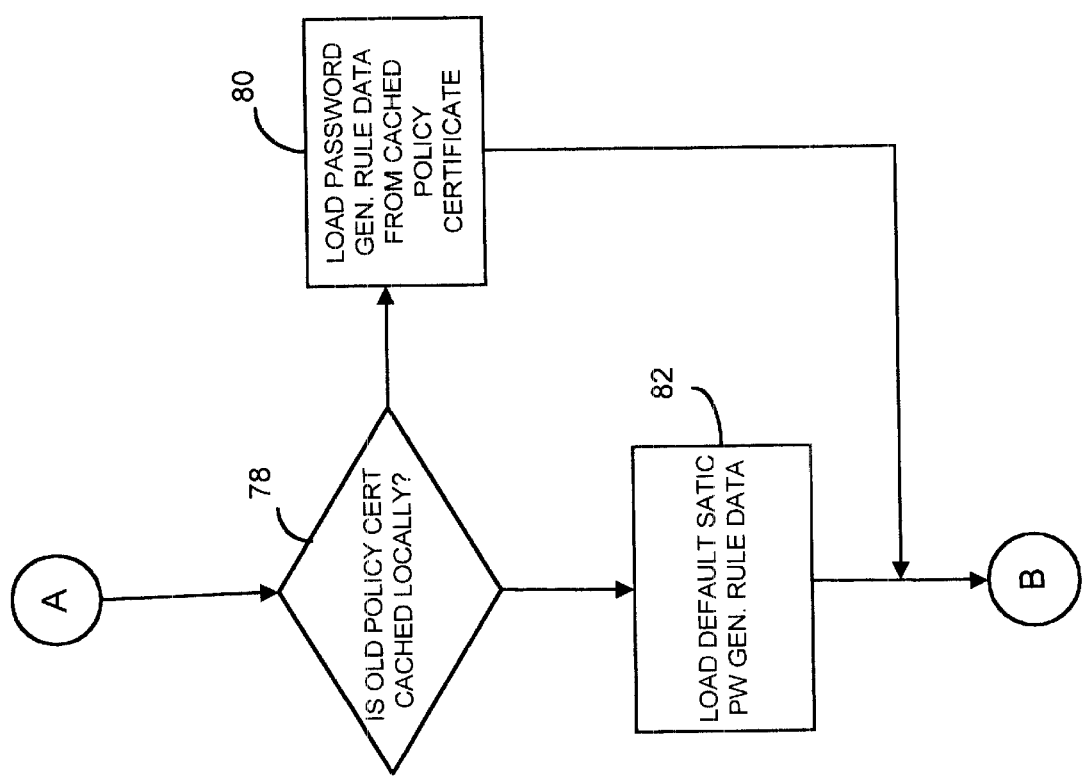

FIGS. 2a and 2b illustrate an example of a method for facilitating password generation when a change in password is desired. As shown in block 60, the system provides a graphic user interface or other suitable interface for a user to indicate that a change in password is desired. As shown in block 62, the user enters password character change information 38 through the data input device 24 in the form of a current password. The system then determines whether it can retrieve from an X.500 type directory the policy certificate associated with the user to obtain the currently configured password generation rule data as shown in block 64. If the system can retrieve the policy certificate associated with the user, the system processes the request data to change the password as indicated in block 66. The change data for the password, such as password data character change information, is entered by the user through the input device and the password generation rule data is evaluated based on the retrieved policy certificate to create both the text based rule data to display on the notification device and enables the system to check the identified rules that were indicated on the retrieved policy certificate as shown in block 68. As shown in block 70, the system receives the password data character change information 38 input through the input device on a per character basis, or other suitable character length basis as selected through the policy certificate. As shown in block 72, the system continuously evaluates each configured rule on a per character change basis prior to receiving complete notification data and generates the appropriate status feedback data (e.g., password rule status data) for the notification device. The appropriate password rule status feedback data is dynamically generated on a continuous basis. As shown in block 74, the system determines whether the password rule status data is equal to confirmation data for all rules, meaning that all selected rules have been met by the character password data that has been entered by the user. If the status feedback password rule data indicates that all rules have been met, the system will accept the changed password and generates the accepted password change data as shown in block 76. However, if the password rule status data indicates that non-confirmation data still exists, the system returns to block 70 awaiting the receipt of new character data.

Returning to block 64, if the system cannot retrieve a policy certificate, which may occur, for example, if the system is no longer connected to the network, the system determines whether any policy certificate has been cached or stored locally as indicated in block 78. If a prior policy certificate has been cached locally, the system loads the password generation rule data from the cached policy certificate as shown in block 80 and uses that rule data as the designated password generation rule data. If no previous policy certificate has been cached locally, the system loads default static password generation rule data as shown in block 82 and uses the default password generation rule data as the basis for determining whether password is properly entered.

FIG. 3 illustrates the additional process that is used if the password is the first password that has been entered for the user. Blocks 90–96 take the place of blocks 62 and 64 in FIG. 2a As shown in block 90, the system receives user identification data such as the name of a user, or where the security profile information is stored, such as in a public/private key cryptographic system, the storage location for the secret signing key and the secret decryption key. The system then generates a preliminary password using, for example, a random number generator so that the password may be used to obtain the policy certificate for the first time. This is shown in block 92. As shown in block 94, the system creates user data, such as the cryptographic keys and any other suitable information using the preliminary password. As shown in block 96, the system obtains the password generation rule data from the policy certificate obtained from the centralized authority using the user data based on the preliminary password. The system then continues to, instead of block 66 in FIG. 2a, prompt the user to enter the password for the first time.

As described herein, the system uses in one embodiment, configurable rule data and dynamically updates rules based on the configurable rule data from a policy certificate or other source and displays the new rules to the user in the form of text data or in the form of audible information if desired. The system reevaluates the entire password field on each change in character without requiring a complete entry notification signal from the system or from the user, such as entering a return key or hitting a button in the graphic user interface.

As previously noted, the apparatus 10 and methods disclosed herein in the various embodiments may be implemented using a programmed computer or other processing device and as such, the program instructions used to perform the operations of the various apparatus and methods may be stored on a storage medium, such as a CDROM, digital tape or any other suitable storage medium, that is run by the processing unit. A storage medium may have different locations containing data representing executable instructions that cause a processing device to provide password generation rule data to a notification device; receive password data in response to providing the password generation rule data; continuously evaluating the password data as it is being received in view of the password generation rule data; and dynamically generating, for the notification device, password rule status data associated with each given rule in the rule data. The storage medium may also have instructions that cause the processing unit and trusted authority as described above. For example, the storage medium also includes data representing executable instructions that cause the processing device to receive configurable password generation rule data configured by a trusted authority.

Figure 4:
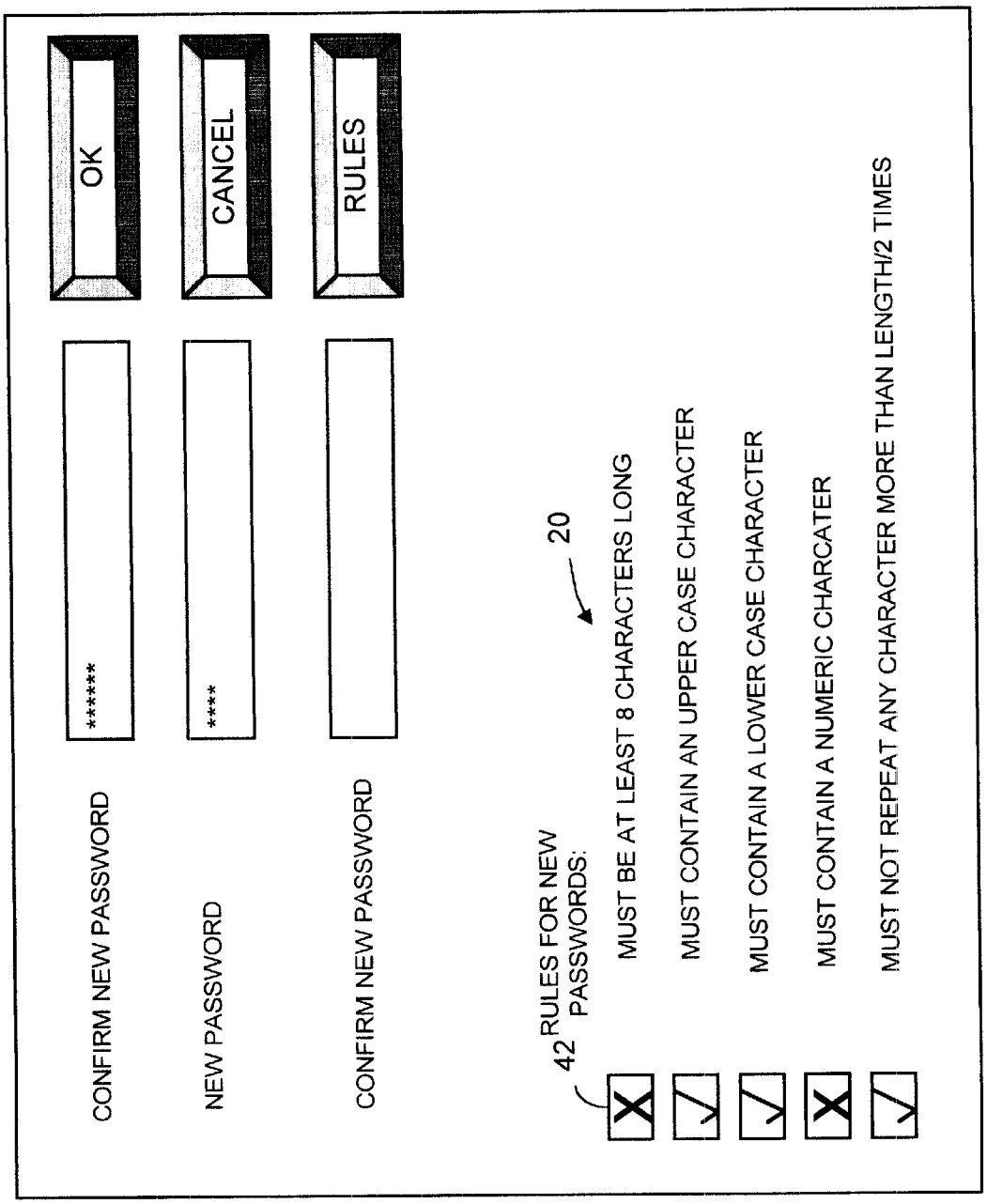
FIG. 4 is a pictorial representation of a display screen showing password generation rule data and corresponding password rule status data in accordance with one embodiment of the invention.

FIG. 4 pictorially represents a display screen showing password generation rule data 20 and corresponding password rule status data 42 represented as "X"'s and check marks. As shown, a display device outputs the data for view by a user. The user enters the password character data and the processor outputs the password rule status data as the user enters the data. As shown, the user in this example improperly entered characters that indicated that the password rules were not met since the entered password does not contain a numeric character as indicated by the "X"'s. Those rules that have been met have a check mark by them.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for facilitating password generation comprising the steps of:
   providing password generation rule data to a notification device;
   receiving password data in response to providing the password generation rule data;
   continuously evaluating the password data as it is being received in view of the password generation rule data; and
   dynamically generating, for the notification device, password rule status data associated with each given rule in the rule data.

2. The method of claim 1 wherein providing password generation rule data includes receiving configurable password generation rule data configured by a trusted authority.

3. The method of claim 2 wherein the trusted authority unit generates a public key policy certificate containing the configurable password generation rule data.

4. The method of claim 1 wherein the step of continuously evaluating the password data includes evaluating password data on a predefined character length basis against each rule corresponding to the password generation rule data prior to receiving complete entry data and wherein the step of dynamically generating password rule status data includes generating the password rule status data upon a change in rule status, prior to receiving complete entry data, based on the continuously evaluated password data.

5. The method of claim 1 wherein password rule status data includes confirmation data corresponding to display rules that have been met.

6. The method of claim 1 wherein password rule status data includes non-confirmation data indicating that rule data has not been satisfied.

7. The method of claim 1 wherein password rule status data includes non-confirmation data indicating that rule data has not been satisfied and includes confirmation data corresponding to display rules that have been met.

8. The method of claim 1 including the step of generating preliminary password data to obtain the password generation rule data prior to receiving the password data.

9. The method of claim 1 including providing continuous password character data rejection on a per character basis in response to continuously evaluating the password data, prior to receiving password entry complete data.

10. The method of claim 1 including selectively varying a character length associated with a number of password characters after which each subsequently entered character is continuously evaluated to determine whether password generation rule data has been satisfied.

11. The method of claim 4 wherein password rule status data includes non-confirmation data indicating that rule data has not been satisfied and includes confirmation data corresponding to display rules that have been met.

12. An apparatus for facilitating password generation comprising:
   at least one password rule data provider that provides password generation rule data to a notification device;
   at least one per character password data evaluator, operatively coupled to receive password character data, that continuously evaluates the password character data on a per character basis in view of the password generation rule data; and
   at least one dynamic status data generator, operatively coupled to the notification device, that dynamically generates password rule status data associated with each given rule in the rule data based on each password character.

13. The apparatus of claim 12 including a policy certificate analyzer operatively coupled to receive a signed policy certificate from a trusted authority unit wherein the signed policy certificate includes configurable password generation rule data configured by the trusted authority.

14. The apparatus of claim 12 wherein the per character password data evaluator evaluates password character data on a predefined character length basis against each rule corresponding to the password generation rule data prior to receiving complete entry data and wherein the dynamic status data generator generates the password rule status data upon a change in rule status, prior to receiving complete entry data, based on the continuously evaluated password data.

15. The apparatus of claim 12 wherein password rule status data includes confirmation data corresponding to display rules that have been met.

16. The apparatus of claim 12 wherein password rule status data includes non-confirmation data indicating that rule data has not been satisfied.

17. The apparatus of claim 12 wherein password rule status data includes non-confirmation data indicating that rule data has not been satisfied and includes confirmation data corresponding to display rules that have been met.

18. The apparatus of claim 12 including a preliminary password data generator that obtains the password generation rule data prior to the apparatus receiving the password data.

19. The apparatus of claim 12 wherein the per character password data evaluator provides continuous password character data rejection on a per character basis in response to continuously evaluating the password data, prior to receiving password entry complete data.

20. The apparatus of claim 12 including a variable character length selector that selects a number of password characters after which each subsequently entered character is continuously evaluated to determine whether password generation rule data has been satisfied.

21. The apparatus of claim 14 wherein password rule status data includes non-confirmation data indicating that rule data has not been satisfied and includes confirmation data corresponding to display rules that have been met.

22. A storage medium comprising:

memory containing data representing executable instructions that cause a processing device to provide password generation rule data to a notification device; receive password data in response to providing the password generation rule data; continuously evaluating the password data as it is being received in view of the password generation rule data; and dynamically generating, for the notification device, password rule status data associated with each given rule in the rule data.

23. The storage medium of claim 22 containing data representing executable instructions that cause the processing device to receive configurable password generation rule data configured by a trusted authority.

24. The storage medium of claim 23 containing data representing executable instructions that cause a trusted authority unit to generate a public key policy certificate containing the configurable password generation rule data.

25. The storage medium of claim 22 containing data representing executable instructions that cause the processing device to evaluate password data on a predefined character length basis against each rule corresponding to the password generation rule data prior to receiving complete entry data and to generate the password rule status data upon a change in rule status, prior to receiving complete entry data, based on the continuously evaluated password data.

26. The storage medium of claim 22 containing data representing executable instructions that cause the processing device to generate preliminary password data to obtain the password generation rule data prior to receiving the password data.

27. The storage medium of claim 22 containing data representing executable instructions that cause the processing device to provide continuous password character data rejection on a per character basis in response to continuously evaluating the password data, prior to receiving password entry complete data.

28. The storage medium of claim 22 containing data representing executable instructions that cause the processing device to selectively vary a character length associated with a number of password characters after which each subsequently entered character is continuously evaluated to determine whether password generation rule data has been satisfied.

* * * * *